United States Patent
Choudhuri et al.

(10) Patent No.: US 9,582,192 B2
(45) Date of Patent: Feb. 28, 2017

(54) GEOMETRY AWARE BLOCK RECLAMATION

(71) Applicant: HGST Netherlands B.V., Amsterdam (NL)

(72) Inventors: Siddharth Choudhuri, Irvine, CA (US); Haining Liu, Irvine, CA (US); Yuriy Pavlenko, Mission Viejo, CA (US)

(73) Assignee: Western Digital Technologies, Inc., Irvine, CA (US)

(*) Notice: Subject to any disclaimer, the term of this patent is extended or adjusted under 35 U.S.C. 154(b) by 43 days.

(21) Appl. No.: 14/616,445

(22) Filed: Feb. 6, 2015

(65) Prior Publication Data

US 2016/0231945 A1    Aug. 11, 2016

(51) Int. Cl.
*G06F 12/00*  (2006.01)
*G06F 3/06*   (2006.01)
*G06F 12/02*  (2006.01)
*G06F 12/08*  (2016.01)

(52) U.S. Cl.
CPC .......... *G06F 3/0608* (2013.01); *G06F 3/0619* (2013.01); *G06F 3/0652* (2013.01); *G06F 3/0653* (2013.01); *G06F 3/0683* (2013.01); *G06F 3/0689* (2013.01); *G06F 12/0253* (2013.01); *G06F 12/0269* (2013.01); *G06F 12/0276* (2013.01); *G06F 12/0888* (2013.01); *G06F 2212/1032* (2013.01); *G06F 2212/604* (2013.01)

(58) Field of Classification Search
CPC .... G06F 3/0689; G06F 3/0619; G06F 3/0653; G06F 12/0253; G06F 12/0269; G06F 12/0276; G06F 12/0888; G06F 2212/1032; G06F 2212/604
See application file for complete search history.

(56) References Cited

U.S. PATENT DOCUMENTS

| | | | |
|---|---|---|---|
| 6,874,074 B1* | 3/2005 | Burton | G06F 12/0269 707/999.202 |
| 8,316,176 B1 | 11/2012 | Phan et al. | |
| 2012/0239871 A1 | 9/2012 | Badam et al. | |
| 2013/0132647 A1 | 5/2013 | Melik-Martirosian | |
| 2014/0052897 A1 | 2/2014 | Goss et al. | |
| 2014/0215129 A1 | 7/2014 | Kuzmin et al. | |
| 2015/0127889 A1* | 5/2015 | Hwang | G06F 12/0246 711/103 |

OTHER PUBLICATIONS

Saxena et al., "Flash VM: Virtual Memory Management on Flash," In Proceedings of 16th Usenix annual Technical Conference, Jun. 2010, 14 pp.

* cited by examiner

*Primary Examiner* — Shawn X Gu
(74) *Attorney, Agent, or Firm* — Shumaker & Sieffert, P.A.

(57) ABSTRACT

A storage device may include a plurality of memory devices, and a controller. The controller may be configured to perform garbage collection to reclaim one or more blocks included in a particular memory device of the plurality of memory devices by at least: removing the particular memory device from the set of write-eligible memory devices; reading data from the one or more blocks included in the particular memory device; and returning the particular memory device to the set of write-eligible memory devices.

20 Claims, 6 Drawing Sheets

GEOMETRY AWARE BLOCK RECLAMATION

TECHNICAL FIELD

This disclosure relates to memory management, and more particularly, to performing garbage collection.

BACKGROUND

Memory devices used in computers or other electronics devices may be non-volatile memory or volatile memory. The main difference between non-volatile memory and volatile memory is that non-volatile memory may continue to store data without requiring a persistent power supply. As a result, non-volatile memory devices have developed into a popular type of memory for a wide range of electronic applications. For instance, non-volatile memory devices, including flash memory devices, are commonly incorporated into solid-state storage devices, such as solid-state drives (SSDs). In some examples, a controller of a memory device may perform one or more operations to manage data stored by the memory device. For instance, where a block of flash memory stores valid data and invalid (stale) data, a controller may perform garbage collection (GC) to remove the invalid data by reading the valid data from the block, erasing the entire block, and writing the valid data back to the flash memory.

SUMMARY

In one example, a storage device may include a plurality of memory devices, and a controller. In this example, the controller is configured to perform garbage collection to reclaim one or more blocks included in a particular memory device of the plurality of memory devices by at least: removing the particular memory device from the set of write-eligible memory devices; reading data from the one or more blocks included in the particular memory device; and returning the particular memory device to the set of write-eligible memory devices.

In another example, a method includes writing, by a controller of a plurality of memory devices, data to memory devices that are included in a set of write-eligible memory devices of the plurality of memory devices, and performing, by the controller, garbage collection to reclaim one or more blocks included in a particular memory device of the plurality of memory devices. In this example, performing garbage collection includes: removing the particular memory device from the set of write-eligible memory devices; reading data from the one or more blocks included in the particular memory device; and returning the particular memory device to the set of write-eligible memory devices.

In another example, a computer-readable storage medium stores instructions that, when executed, cause one or more processors of a storage device to: write data to memory devices of a plurality of memory devices that are included in a set of write-eligible memory devices; and perform garbage collection to reclaim one or more blocks included in a particular memory device of the plurality of memory devices by at least: removing the particular memory device from the set of write-eligible memory devices; reading data from the one or more blocks included in the particular memory device; and returning the particular memory device to the set of write-eligible memory devices.

In another example, a system includes means for writing data to memory devices of a plurality of memory devices included in a set of write-eligible memory devices, and means for performing garbage collection to reclaim one or more blocks included in a particular memory device of the plurality of memory devices. In this example, the means for performing garbage collection include: means for removing the particular memory device from the set of write-eligible memory devices; means for reading data from the one or more blocks included in the particular memory device; and means for returning the particular memory device to the set of write-eligible memory devices.

The details of one or more examples are set forth in the accompanying drawings and the description below. Other features, objects, and advantages will be apparent from the description and drawings, and from the claims.

DETAILED DESCRIPTION

Figure 1:
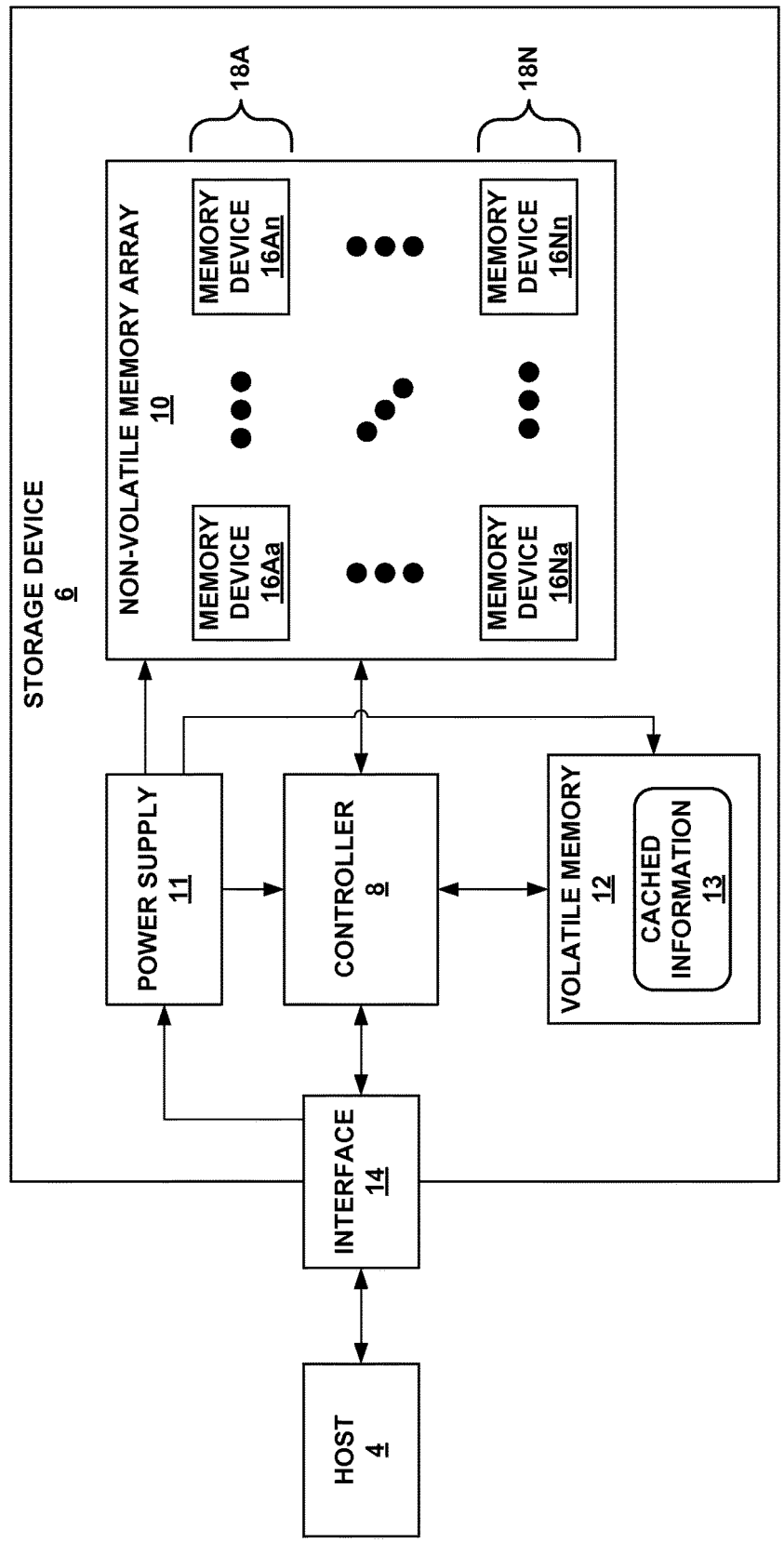
FIG. 1 is a conceptual and schematic block diagram illustrating an example storage environment in which a storage device may function as a storage device for a host device, in accordance with one or more techniques of this disclosure

This disclosure describes a storage device that includes a controller that is configured to perform garbage collection (GC). To perform garbage collection, a controller may perform at least a read operation to read valid data from a memory device and a write operation to write the valid data to a memory device (which may be same or different than the original memory device). As the data written during the write operation has to be read during the read operation, the order of operations performed by a controller during GC must be write-after-read.

In some examples for some memory technologies, it may take longer for a controller to perform a write operation than a read operation. For instance, a controller may be able to perform a read operation 15-70 times faster than a write operation.

In some examples, a controller may perform GC as a background process with respect to host requests (i.e., read and write operations requested by a host device). A controller may attempt to perform GC without impacting host activity. However, in some examples, GC operations may collide with host read operations. For instance, while a controller performs GC to reclaim a block on a particular memory device, the controller may receive a host request for data to be written to or read from the particular memory device. In some implementations, the controller may wait until GC is complete before performing the host request. This wait may increase the amount of time (i.e., latency) between when the host device issues the request and when the controller provides the data to the host device fulfilling the host request. As such, it may be desirable to reduce the amount of time memory devices are made unavailable to the controller due to GC.

In accordance with one or more techniques of this disclosure, a controller may separate a GC read operation from a GC write operation and merge the GC write operation with host write operations. For instance, the controller may perform host write operations to write data received from a host device to one or more of a set of write-eligible memory devices of a plurality of memory devices. The controller may determine to perform GC to reclaim one or more blocks in a particular memory device of the set of write-eligible memory devices. To perform GC, the controller may remove the particular memory device from the set of write-eligible memory devices, perform a GC read operation to read data from the one or more blocks included in the particular memory device, return the particular memory device to the set of write-eligible memory devices, and schedule a GC write operation to write at least some of the data read from the one or more blocks back to a memory device of the plurality of memory devices along with write operations to write data received from a host device. In this way, the controller may reduce the amount of time the particular memory device is unavailable to write data from or read for the host device due to GC, which may reduce the amount of time used to fulfill host requests.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory array 10 (NVMA 10), cache 12, and interface 14. In some examples, storage device 6 may include additional components not shown in FIG. 1 for sake of clarity. For example, storage device 6 may include power delivery components, including, for example, a capacitor, super capacitor, or battery; a printed board (PB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4.

Storage device 6 may include NVMA 10, which may include a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

Figure 2:
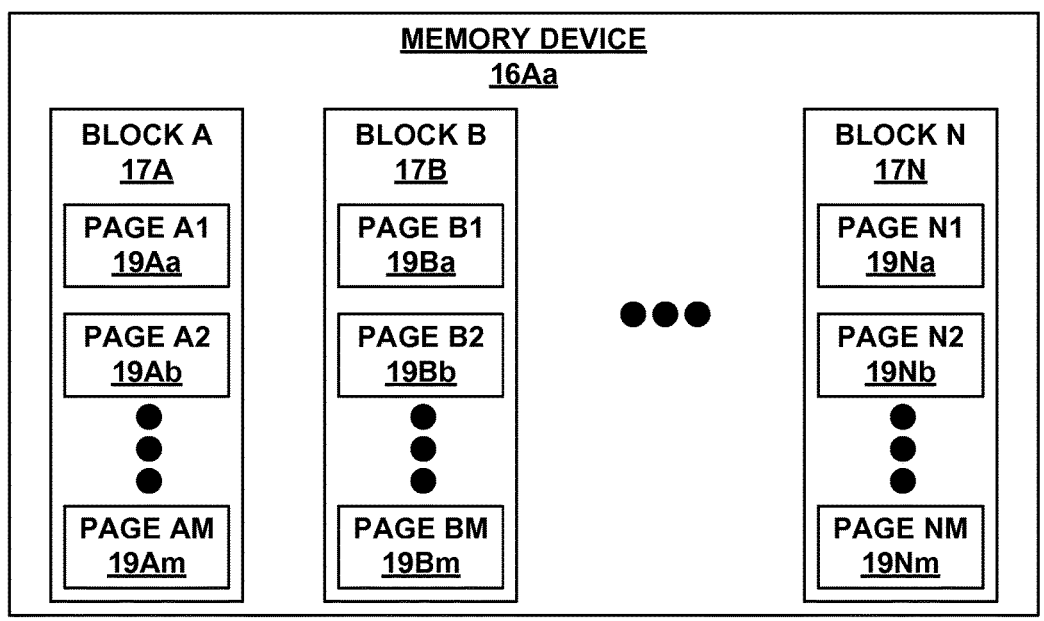
FIG. 2 is a conceptual block diagram illustrating an example memory device that includes a plurality of blocks, each block including a plurality of pages, in accordance with one or more techniques of this disclosure.

In some examples, memory devices 16 may include flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks. FIG. 2 is a conceptual block diagram illustrating an example, memory device 16Aa that includes a plurality of blocks 17A-17N (collectively, "blocks 17"), each block including a plurality of pages 19Aa-19Nm (collectively, "pages 19"). Each block of blocks 17 may include a plurality of NAND cells. Rows of NAND cells may be serially electrically connected using a word line to define a page (one page of pages 19). Respective cells in each of a plurality of pages 19 may be electrically connected to respective bit lines. Controller 6 may write data to and read data from NAND flash memory devices at the page level and erase data from NAND flash memory devices at the block level.

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16An may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over provisioning. For example, if storage device 6 is advertised to include 240 GB of user-accessible storage capacity, storage device 6 may include sufficient memory devices 16 to give a total storage capacity of 256 GB. The 16 GB of storage devices 16 may not be accessible to host device 4 or a user of host device 4. Instead, the additional storage devices 16 may provide additional blocks 17 to facilitate writes, garbage collection, wear leveling, and the like. Further, the additional storage devices 16 may provide additional blocks 17 that may be used if some blocks wear to become unusable and are retired from use. The presence of the additional blocks 17 may allow retiring of the worn blocks without causing a change in the storage capacity available to host device 4. In some examples, the amount of over-provisioning may be defined as $p=(T-D)/D$, wherein p is the over-provisioning ratio, T is the total storage capacity of storage device 2, and D is the storage capacity of storage device 2 that is accessible to host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information 13 in volatile memory 12 until cached information 13 is written to memory devices 16. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Storage device 6 includes controller 8, which may manage one or more operations of storage device 6. For instance, controller 8 may manage the reading of data from and/or the writing of data to memory devices 16. In some examples, controller 8 may perform one or more operations to manage data stored by memory devices 16. For instance, controller 8 may perform garbage collection (GC) to remove invalid (stale) data from memory devices 16 to, e.g., reclaim blocks to store new data. Additional details of controller 8 are discussed below with reference to FIG. 3.

In accordance with or more techniques of this disclosure, as opposed to performing GC as a contiguous set of read and write operations, controller 8 may separate GC read operations from GC write operations and merge GC write operations with host write operations. For instance, controller 8 may perform host write operations to write data received from host device 4 to one or more of a set of write-eligible memory devices of memory devices 16. Controller 8 may determine to perform GC to reclaim one or more blocks in a particular memory device of the set of write-eligible memory devices. To perform GC, controller 8 may remove the particular memory device from the set of write-eligible memory devices, perform a GC read operation to read data from the one or more blocks included in the particular memory device, return the particular memory device to the set of write-eligible memory devices, and schedule a GC write operation to write at least some of the data read from the one or more blocks back to a memory device of the plurality of memory devices along write operations to write data received from host device 4. In this way, controller 8 may reduce the amount of time the particular memory device is unavailable due to GC, which may reduce the amount of time used to fulfill host requests.

Figure 3:
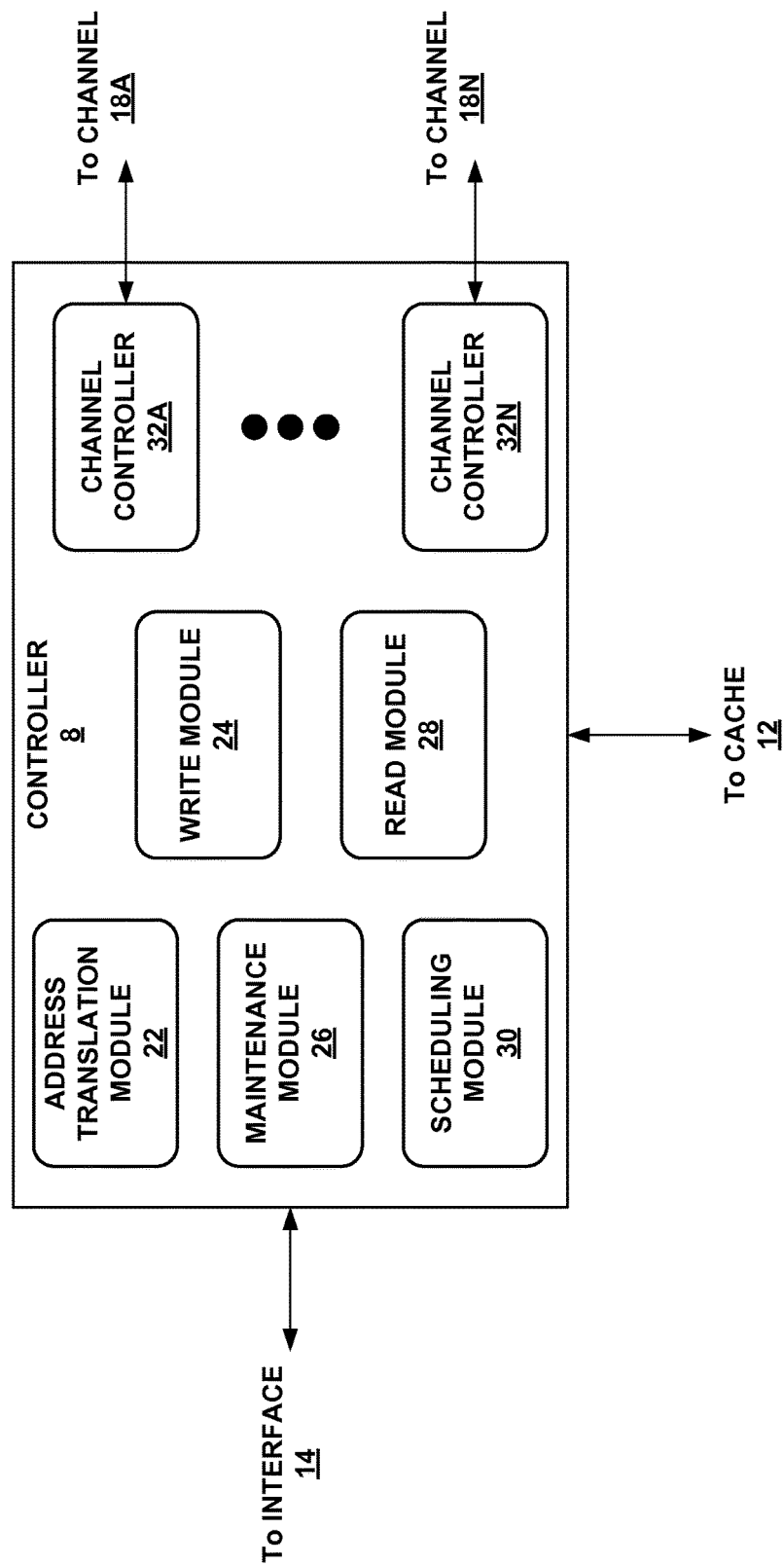
FIG. 3 is a conceptual and schematic block diagram illustrating example details of a controller, in accordance with one or more techniques of this disclosure.

FIG. 3 is a conceptual and schematic block diagram illustrating example details of controller 8. In some examples, controller 8 may include an address translation module 22, a write module 24, a maintenance module 26, a read module 28, a scheduling module 30, and a plurality of channel controllers 32A-32N (collectively, "channel controllers 32"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry.

Controller 8 may interface with the host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical address and the data. Write module 24 may manage writing of the data to memory devices 16.

For example, write module 24 may communicate with address translation module 22, which manages translation between logical addresses used by host device 4 to manage storage locations of data and physical block addresses used by write module 24 to direct writing of data to memory devices. Address translation module 22 of controller 8 may utilize a flash translation layer or table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12, such as within cached information 13.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 32 that corresponds to the particular memory device), and cause address translation module 22 to update the flash translation layer or table to indicate that the logical block address corresponds to the selected block within the particular memory device.

In some instances, the data to be written may be in units that are larger than a single block (i.e., a single physical block) of a memory device of memory devices 16. As such, write module 24 may select multiple blocks, collectively referred to as a logical container, to each store a portion of the unit of data. For instance, write module 24 may define a logical container by selecting multiple blocks from a single memory device of memory devices 16. However, in some examples, it may not be desirable for write module 24 to select all of the blocks of a logical container from a single memory device. For instance, it may not be possible to write to multiple blocks included in a single memory device in parallel.

Therefore, as opposed to defining a logical container by selecting multiple blocks from a single memory device of memory devices 16, write module 24 may define a logical container by selecting blocks from a plurality of memory devices 16. As one example, where NVMA 10 includes 128 of memory devices 16 arranged into sixteen channels that each have eight chip enable (CE) lines/targets, one CE line/target for each of memory devices 16 in a channel (i.e., where channel 18A includes memory devices 16Aa-Ah, . . . , and channel 18P includes memory devices 16Pa-Ph), write module 24 may define a logical container that includes 128 blocks by selecting a block from each of memory devices 16Aa-16Ph. Write module 24 may then cause the plurality of memory devices 16 to store the portions of the unit of data in parallel at the selected blocks. In this way, write module 24 may increase the rate at which data may be stored to memory devices 16 by writing portions of the data to different memory devices 16, e.g., connected to different channels 18. However, in some examples, it may not be desirable for a logical container to include a block from each of memory devices 16.

In accordance with one or more techniques of this disclosure, as opposed to defining a logical container that includes a block from each of memory devices 16, write module 24 may define a blockset that includes a block from each memory device of a sub-set of memory devices 16 that includes at least one memory device from each of channels 18. In some examples, the sub-set of memory devices 16 may be referred to as a die-set. For instance, write module 24 may partition memory devices 16 based on respective CE lines associated with respective ones of memory devices 16 to define a plurality of sub-sets of memory devices 16, each sub-set including at least one memory device (e.g., die) from each of channels 18. For each respective sub-set of the plurality of sub-sets of memory devices 16, write module 24 may define a respective plurality of blocksets, each blockset including a block from each die of the respective sub-set of the plurality of sub-sets of memory devices 16. In this way, e.g., by using blocksets that include fewer blocks, write module 24 may decrease the amount of time needed to erase blocks in a blockset, which may also decrease the latency for blocksets to return to the free resource pool. Also in this way, the amount of time needed for a garbage collection operation to reclaim a blockset may be reduced.

In some examples, in addition to causing the portions of the unit of data to be stored by memory devices 16, write module 24 may cause memory devices 16 to store information which may be used to recover the unit of data should one or more of the blocks fail or become corrupted. For instance, write module 24 may cause memory devices 16 to store parity information in a block within each blockset. The parity information may be used to recover the data stored by other blocks of the blockset. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to memory devices 16 and the amount of data actually written to memory devices 16. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may wear out, such that data may no longer be written to the cells.

One technique that controller 8 may implement to reduce write amplification and wear of flash memory cells includes writing data received from host device 4 to unused blocks (e.g., blocks 17 of FIG. 2) or partially used blocks. For example, if host device 4 sends data to storage device 6 that includes only a small change from data already stored by storage device 6. The controller then may mark the old data as stale or no longer valid. Over time, this may reduce a number of erase operations blocks are exposed to, compared to erasing the block that holds the old data and writing the updated data to the same block.

Responsive to receiving a write command from host device 4, write module 24 may determine at which physical locations (blocks 17) of memory devices 16 to write the data. For example, write module 24 may request from address translation module 22 or maintenance module 26 one or more physical block addresses that are empty (e.g., store no data), partially empty (e.g., only some pages of the block store data), or store at least some invalid (or stale) data. Upon receiving the one or more physical block addresses, write module 24 may define and/or select one or more blocksets as discussed above, and communicate a message to channel controllers 32A-32N (collectively, "channel controllers 32"), which causes the channel controllers 32 to write the data to the blocks of the blockset.

Read module 28 similarly may control reading of data from memory devices 16. For example, read module 28 may receive a message from host device 4 requesting data with an associated logical block address. Address translation module 22 may convert the logical block address to a physical block address using the flash translation layer or table. Read module 28 then may control one or more of channel controllers 32 to retrieve the data from the physical block addresses. Similar to write module 24, read module 28 may select one or more blocksets and communicate a message to channel controllers 32 that may cause channel controllers 32 to read the data from the blocks of the blockset.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block (e.g., block 17 of FIG. 2) including those cells may be retired (no longer used by controller 8 to store data). To increase the amount of data that may be written to memory devices 16 before blocks are worn and retired, maintenance module 26 may implement wear leveling.

In wear leveling, maintenance module 26 may track a number of erases of or writes to a block or a group of blocks, for each block or group of blocks. Maintenance module 26 may cause incoming data from host device 4 to be written to a block or group of blocks that has undergone relatively fewer writes or erases, to attempt to maintain the number of writes or erases for each block or group of blocks approximately equal. This may cause each block of memory devices 16 to wear out at approximately the same rate, and may increase the useful lifetime of storage device 6.

Although this may reduce write amplification and wear of flash memory cells by reducing a number of erases and writing data to different blocks, this also may lead to blocks including some valid (fresh) data and some invalid (stale) data. To combat this, maintenance module 26 may implement garbage collection. In a garbage collection operation, maintenance module 26 may analyze the contents of the blocks of memory devices 16 to determine a block that contain a high percentage of invalid (stale) data. Maintenance module 26 then may rewrite the valid data from the block to a different block, and then erase the block. This may reduce an amount of invalid (stale) data stored by memory devices 16 and increase a number of free blocks, but also may increase write amplification and wear of memory devices 16. In some examples, maintenance module 26 may perform garbage collection within each of the plurality of die-sets to generate empty blocks within block-sets. In this way, maintenance module 26 may increase the likelihood that empty blocks or blocksets may be successfully defined within each die-set.

Scheduling module 30 of controller 8 may perform one or more operations to schedule activities to be performed by memory devices 16. For instance, scheduling module 30 may schedule requests received from other components of controller 8 to command one or more of memory devices 16 to perform one or more activities during run-time. In some examples, scheduling module 30 may schedule the requests to be performed in the order in which they were received (e.g., first-in first-out or FIFO). In some examples, scheduling module 30 may schedule the requests based one or more factors which may include, but are not limited to, the type of request (e.g., a read request, a write request, an erase request, a garbage collection request, etc.), an amount of time elapsed since the request was received, an amount of power that would be consumed by performance of the request, bandwidth considerations, and the like.

As one example, scheduling module 30 may schedule activities to be performed based on a quantity of memory devices of memory devices 16 that may be concurrently active (e.g., concurrently reading, writing, and/or erasing data). For instance, scheduling module 30 may determine the quantity of memory devices of memory device 16 that may be concurrently active based on a power consumption budget, a performance target, or both. The power consumption budget may indicate an amount of power available for use by memory devices 16. For instance, where storage device 6 has a power target of 25 W, the power consumption budget may allocate a portion of the power target (e.g., 16 W) for use by memory devices 16. However, in some examples, the amount of power that would be consumed if all of memory devices 16 were concurrently active may be greater than the allocated portion of the supplied power. As such, scheduling module 30 may determine a quantity of memory devices 16 that may be currently active without consuming more power than the allocated portion.

As another example, scheduling module 30 may schedule activities to be performed by controller 8 (e.g., write module 24, maintenance module 26, or read module 28) based on a set of write-eligible memory devices of memory devices 16. For instance, scheduling module 30 may only schedule write activities to be performed by memory devices included in the set of write-eligible memory devices. In some examples, scheduling module 30 may determine that each memory device of memory devices 16 is included in the set of write-eligible memory devices. For example, as a default condition, each memory device of memory devices 16 may included in the set of write-eligible memory devices. In some examples, scheduling module 30 may add or remove memory devices from the set of write-eligible memory devices in response to requests received from one or more other components of storage device 6. As one example, in response to receiving a message from maintenance module 26, scheduling module 30 may remove a particular memory device from the set of write-eligible memory devices. As another example, in response to receiving a message from maintenance module 26, scheduling module 30 may add a particular memory device to the set of write-eligible memory devices.

As discussed above, maintenance module 26 may perform one or more maintenance activities, such as garbage collection, on memory devices 16 in order to, e.g., increase the number of free blocks, blocksets, or both. In accordance with one or more techniques of this disclosure, maintenance module 26 and scheduling module 30 may coordinate to separate GC read operations from GC write operations and merge GC write operations with host write operations. For instance, maintenance module 26 may determine to perform GC to reclaim one or more blocks of a particular memory device of memory devices 16. As one example, maintenance module 26 may determine to reclaim block 17B of memory device 16Aa of FIG. 2 in response to determining that a number of pages 19Ba-19Bm that contain invalid (stale) data is greater than a threshold number of pages.

In accordance with one or more techniques of this disclosure, maintenance module 26 may be aware of how blocks 17 are physically and/or logically arranged within memory devices 16 (i.e., maintenance module 26 may be aware of the flash geometry). For instance, to perform GC on the particular memory device of memory devices 16, maintenance module 26 may output a request to scheduling module 30 to remove the particular memory device of memory devices 16 from a set of write-eligible memory devices of memory devices 16.

In response to receiving the request, scheduling module 30 may remove the particular memory device of memory devices 16 from the set of write-eligible memory devices. For instance, scheduling module 30 may remove memory device 16Aa from the set of write-eligible memory devices. As discussed above, the set of write-eligible memory devices may be the memory devices of memory devices 16 to which scheduling module 30 may schedule write operations to be performed. In some examples, scheduling module 30 may output a message to maintenance module 26 to confirm that the particular memory device of memory devices 16 has been excluded from the set of write-eligible memory devices.

Maintenance module 26 may read data from the one or more blocks of the particular memory device of memory devices 16. For instance, maintenance module 26 may cause read module 28 to cause channel controller 32A to issue commands that cause memory device 16Aa to output the data stored at block 17B. In some examples, maintenance module 26 may cause read module 28 to read the data after receiving a message from scheduling device 30 that confirms that the particular memory device of memory devices 16 has been removed from the set of write-eligible memory devices. In some examples, as opposed to reading data from all the pages of the one or more blocks of the particular memory device, maintenance module 26 may cause read module 28 to read data from valid pages of the one or more blocks of the particular memory device. In this way, read module 28 may avoid reading pages that include invalid data.

After reading data from blocks of the particular memory device, maintenance module 26 may cause scheduling module 30 to return the particular memory device from the set of write-eligible memory devices. For instance, maintenance module 26 may output a request to scheduling module 30 to return memory device 16Aa to the set of write-eligible memory devices.

Maintenance module 26 may cause write module 24 to write at least some of the data read from the one or more blocks of the particular memory device of memory devices 16 to one or more of memory devices 16. For instance, maintenance module 26 may cause write module 24 to output a request to scheduling module 30 to schedule write operations to write the valid data read from block 17B to one or more of memory devices 16. In some examples, maintenance module 26 may cause write module 24 to write at least some of the data read from the one or more blocks of the particular memory device of memory devices 16 back to the particular memory device of memory devices 16, e.g., after scheduling module 30 has returned the particular memory device to the set of write-eligible memory devices. In some examples, maintenance module 26 may cause write module 24 to write at least some of the data read from the one or more blocks of the particular memory device of memory devices 16 to another memory device of memory devices 16, e.g., before or after scheduling module 30 has returned the particular memory device to the set of write-eligible memory devices.

As discussed above, scheduling module 30 may schedule write operations (e.g., GC write operations) to write at least some of the data read from the particular memory device to one or more of memory devices 16. In accordance with one or more techniques of this disclosure, scheduling module 30 may merge the GC write operations with host write operations. For instance, scheduling module 30 may maintain a single write queue that includes both GC write operations and host write operations. In this way, scheduling module 30 and maintenance module 26 may work together to separate GC read operations from GC write operations and merge the GC write operations with host write operations.

Figure 4:
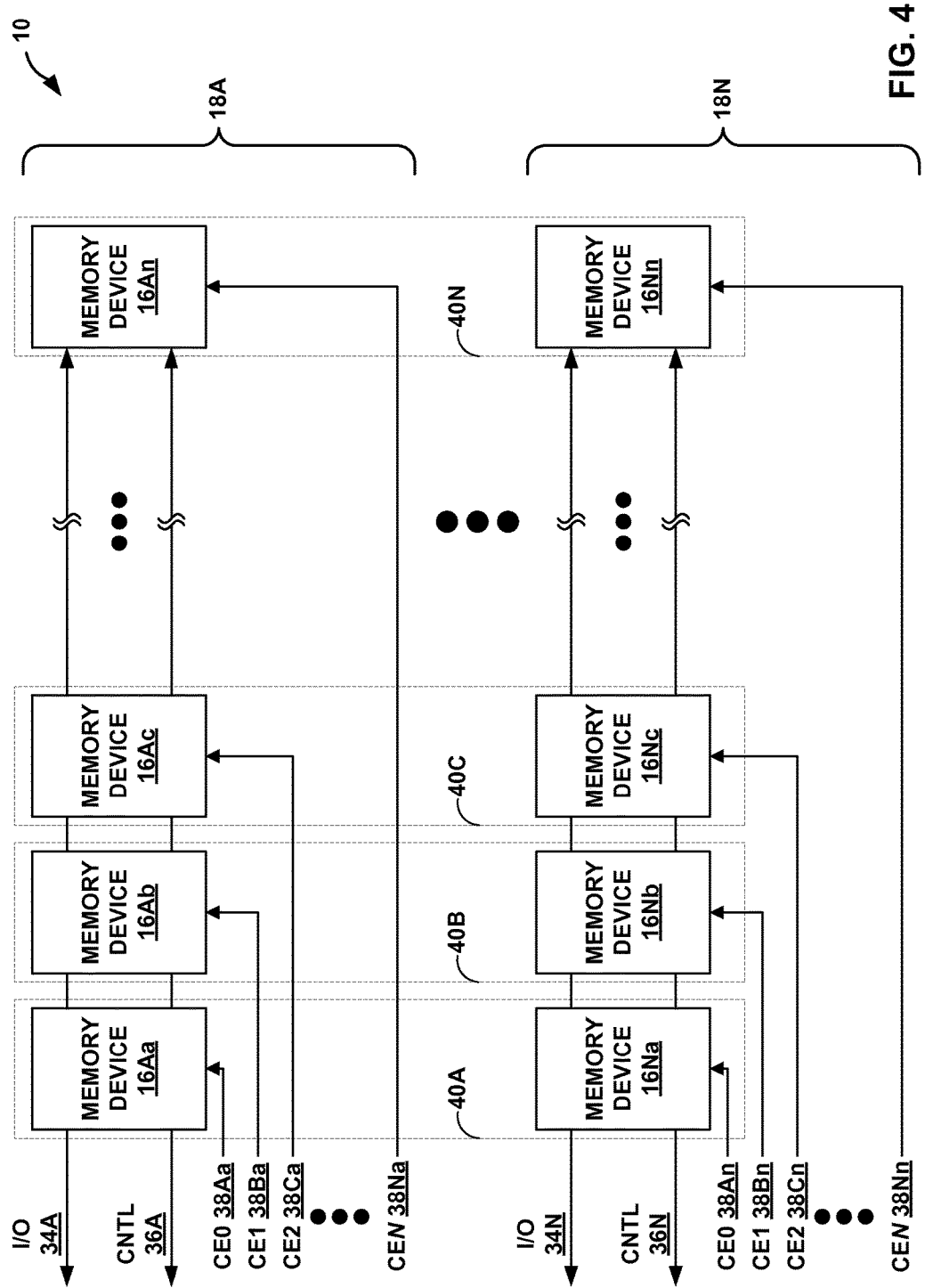
FIG. 4 is a conceptual block diagram illustrating an example non-volatile memory array that includes a plurality memory devices arranged into a plurality of channels, in accordance with one or more techniques of this disclosure.

FIG. 4 is a conceptual and schematic diagram illustrating further details of an example non-volatile memory array 10 of FIG. 1, in accordance with one or more techniques of this disclosure. As discussed above, memory devices 16 may be grouped into channels 18 and the memory devices of memory devices 16 on each channel may share one or more connections to controller 8. For instance, the memory devices 16 grouped into a respective channel of channels 18 may be attached to a respective common I/O bus of I/O buses 34A-34N (collectively, "I/O buses 34") and a respective common control bus of control busses 36A-36N (collectively, "control buses 36"). As illustrated in FIG. 4, memory devices 16Aa-16An of channel 18A may each be attached to I/O bus 34A and control bus 36A.

In some examples, each respective I/O bus of I/O buses 34 may include a plurality of bidirectional I/O lines (e.g., 8 lines, 16 lines, etc.) that may be used to exchange address information, data, and instruction information between controller 8 and memory devices 16 attached to the respective I/O bus. In some examples, each respective control bus of control buses 36 may include a plurality of lines that may be used to exchange control signals, and status information between controller 8 and memory devices 16 attached to the respective control bus. For instance, an example control bus of control buses 36 may include an address latch enable (ALE) line, a command latch enable (CLE) line, a read-enable (RE) line, a write-enable (WE) line, and a write-protect (WP) line that may be used by controller 8 to send commands to a memory device of memory devices 16; and a ready/busy (R/B) line that may be used by a memory device of memory devices 16 to send status information to controller 8.

As discussed above, each channel of channels 18 may include a set of chip enable (CE) lines which may be used to multiplex memory devices on each channel. For example, as illustrated in FIG. 4, CE lines 38Aa-38Na may be used to multiplex memory devices 16Aa-16An of channel 18A. Similarly, CE lines 38An-38Nn may be used to multiplex memory devices 16Na-16Nn of channel 18N. For instance, to send a message to memory device 16Aa, controller 8 may send a signal via CE0 38Aa that causes memory device 16Aa to "listen" to one or both of the signals on I/O bus 34A and the signals on control bus 36A. Controller 8 may then issue a command to memory device 16Aa by outputting signals on one or both of I/O bus 34A and control bus 36A. In this way, controller 8 may multiplex memory devices of memory devices 16 within a particular channel of channels 18.

Controller 8 may define a blockset that includes a block from each memory device of a sub-set (e.g., a die-set) of memory devices 16 that includes at least one memory device from each of channels 18. As discussed above and illustrated in FIG. 4, controller 8 may partition memory devices 16 to define die-sets 40A-40N (collectively, "die-sets 40") that each include at least one memory device (e.g., die) from each of channels 18. In other words, controller 8 may logically arrange memory devices 16 into a plurality of die-sets. In some examples, controller 8 may partition memory devices 16 into die-sets 40 based on CE lines associated with memory devices 16. For instance, controller 8 may partition all of the dies physically located on a particular CE line (i.e., CE0 on each of channels 18) into a particular (or selected) die-set of die-sets 40. As one example, controller 8 may partition memory devices of memory devices 16 physically located on CE0 of each channel (i.e., memory devices 16Aa, 16Ba, . . . , and 16Na) into die-set 40A. In some examples, controller 8 may partition memory devices 16 into die-sets 40 based on other arrangements. For instance, controller 8 may partition memory devices of memory devices 16 physically located on varying CEs of each channel (i.e., memory devices 16Aa, 16Bc, . . . , and 16Nb) into a die-set. Further details of an example die-set 40A of die-sets 40 are discussed below with respect to the conceptual diagram illustrated in FIG. 5.

Figure 5:
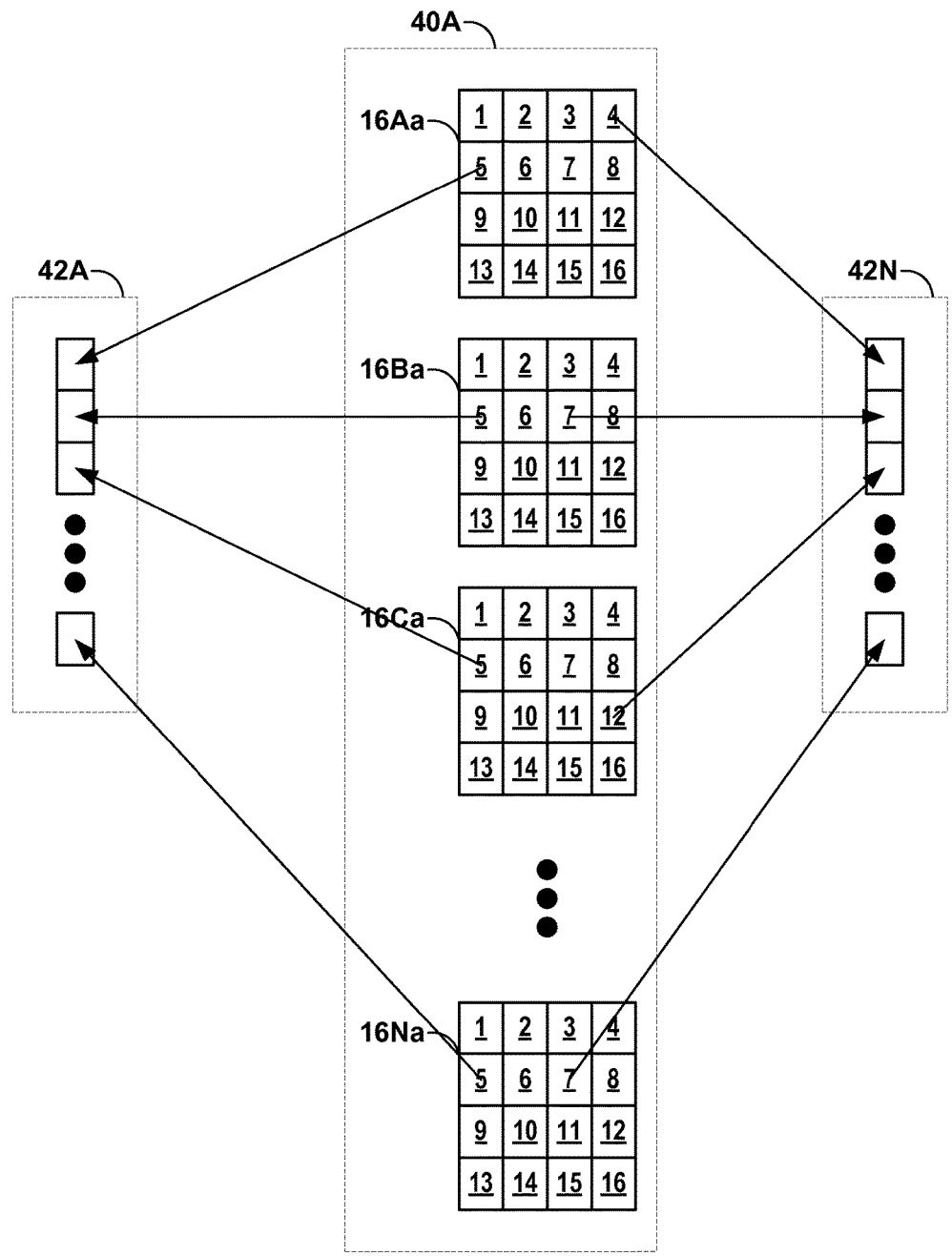
FIG. 5 is a conceptual block diagram illustrating an example technique that may be performed by a controller of a storage device to define blocksets from a die-set, in accordance with one or more techniques of this disclosure.

In the example illustrated in FIG. 5, each memory device 16Aa-16Na of die-set 40A includes 16 blocks. Although 16 blocks are illustrated for each of memory devices 16Aa-16Na in the example of FIG. 5, in other examples, each of memory devices 16Aa-16Na may include more blocks. From the plurality of memory devices 16Aa-16Na in die-set 40A, controller 8 may define a plurality of blocksets 42A-42N (collectively, "blocksets 42"). Each blockset of blocksets 42 may include a block (e.g., a single block) from each die of the die-set 40A.

In some examples, controller 8 may select a block from a particular location within memory devices 16Aa, 16Ba, . . . , and 16Na to define a blockset of blocksets 42. For example, as illustrated in FIG. 5, each block included in blockset 42A is from a respective location 5 of each of memory devices 16Aa, 16Ba, . . . , and 16Na. In some examples, controller 8 may select block from varying locations within memory devices 16Aa, 16Ba, . . . , and 16Na to define a blockset of blocksets 42. For example, as illustrated in FIG. 5, blockset 42N may include block 4 from memory device 16Aa, block 7 from memory device 16Ba, block 12 from memory device 16Ca, . . . , and block 7 from memory device 16Na. In some examples, such as where it is no longer desirable to use a block at a particular location of a memory device (e.g., where the block has failed, has a relatively large write/erase cycle count compared to other blocks of the same memory device, etc.), controller 8 may continue to select blocks at the particular location (or a different location) from other memory devices within die-set 40A to define blocksets.

In some examples, controller 8 may define the blocksets using a virtualized arrangement of memory devices 16 within NVMA 10. For instance, as opposed to selecting a single memory device of memory devices 16 from each of physical channels 18, controller 8 may select multiple memory devices of memory devices 16 from each of physical channels 18 to define a die-set of die-sets 40. In particular, controller 8 may select memory devices of memory devices 16 attached to different CE lines within each of physical channels 18 to define a die-set of die-sets 40.

In some examples, controller 8 may be configured to perform GC to reclaim blocksets (i.e., to create empty blocksets). For instance, maintenance module 26 of controller 8 may determine to reclaim a particular blockset of a particular die-set. As one example, maintenance module 26 may determine to reclaim blockset 42A of die-set 40A, e.g., in response to determining that a number of pages included in blocks of blockset 42A that contain invalid (stale) data is greater than a threshold number of pages. In other examples, controller 8 may be configured to perform GC to reclaim one or more blocks within a blockset.

In accordance with one or more techniques of this disclosure, maintenance module 26 may aware of how blocks are physically and/or logically arranged within memory devices 16 (i.e., the flash geometry). For instance, maintenance module 26 may be aware that memory devices 16 are spread across channels 18, that memory devices 16 are logically arranged into die-sets 40, and that blocks of die-sets 40 are arranged into blocksets 42. To perform GC to reclaim the particular blockset of the particular die-set, maintenance module 26 may output a request to cause scheduling module 30 to temporarily cease scheduling write operations for memory devices of memory devices 16 that include blocks of the particular blockset. As one example, maintenance module 26 may output a request to remove memory devices of memory devices 16 that include blocks of the particular blockset from a set of write-eligible memory devices of memory devices 16. As another example, maintenance module 26 may output a request to remove the particular die-set from a set of write-eligible die-sets of die-sets 40.

In response to receiving the request, scheduling module 30 may remove the memory devices of memory devices 16 that include blocks of the particular blockset by temporarily ceasing to schedule write operations for the memory devices of memory devices 16 that include blocks of the particular blockset. As one example, scheduling module 30 may remove memory devices of memory devices 16 that include blocks of the particular blockset from the set of write-eligible memory devices of memory devices 16. As another example, scheduling module 30 may remove the particular die-set from the set of write-eligible die-sets of die-sets 40. In some examples, scheduling module 30 may output a message to maintenance module 26 to confirm that scheduling module 30 has complied with the request.

Maintenance module 26 may read data from one or more blocks of the particular blockset of the particular die-set. For instance, maintenance module 26 may cause read module 28 to cause channel controllers 32 to issue commands that cause the memory devices of die-set 40 (i.e., memory devices 16Aa-16Na) to output the data stored at the blocks of blockset 42A. In some examples, maintenance module 26 may cause read module 28 to read the data in response to receiving a message from scheduling device 30 that confirms scheduling module 30 has complied with the request to, e.g., remove the particular die-set from the set of write-eligible die-sets of die-sets 40. In some examples, as opposed to reading data from all the pages of the blocks of the particular blockset, maintenance module 26 may cause read module 28 to read data from valid pages of the blocks of the particular blockset.

Maintenance module 26 may cause scheduling module 30 to resume scheduling write operations for memory devices of memory devices 16 that include blocks of the particular blockset. As one example, maintenance module 26 may output a request to return memory devices of memory devices 16 that include blocks of the particular blockset to the set of write-eligible memory devices of memory devices 16. As another example, maintenance module 26 may output a request to return the particular die-set to the set of write-eligible die-sets of die-sets 40. In some examples, maintenance module 26 may cause scheduling module 30 to resume scheduling write operations for memory devices of memory devices 16 that include blocks of the particular blockset after completing the reading of data from the blocks of the particular blockset.

Maintenance module 26 may write at least some of the data read from the blocks of the particular blockset of the particular die-set to a blockset of a die-set. As one example, maintenance module 26 may output a request to scheduling module 30 to schedule write operations to write the valid data read from blockset 42A of die-set 40A to another blockset of die-set 40A. As another example, maintenance module 26 may output a request to scheduling module 30 to schedule write operations to write the valid data read from blockset 42A of die-set 40A to a blockset of another die-set of die-sets 40.

As discussed above, scheduling module 30 may schedule write operations (e.g., GC write operations) to write at least some of the data read from the particular blockset back to one or more of memory devices 16. In accordance with one or more techniques of this disclosure, scheduling module 30 may merge the GC write operations with host write operations. For instance, scheduling module 30 may maintain a single write queue that includes both GC write operations and host write operations. As one example, the single write queue may include a first write operation to write at least some of the data read from the particular blockset to a blockset of die-set 40B, and a second write operation to write data received from host device 4 to a blockset of die-set 40B. In this way, scheduling module 30 and maintenance module 26 may work together to separate GC read operations from GC write operations and merge the GC write operations with host write operations.

Figure 6:
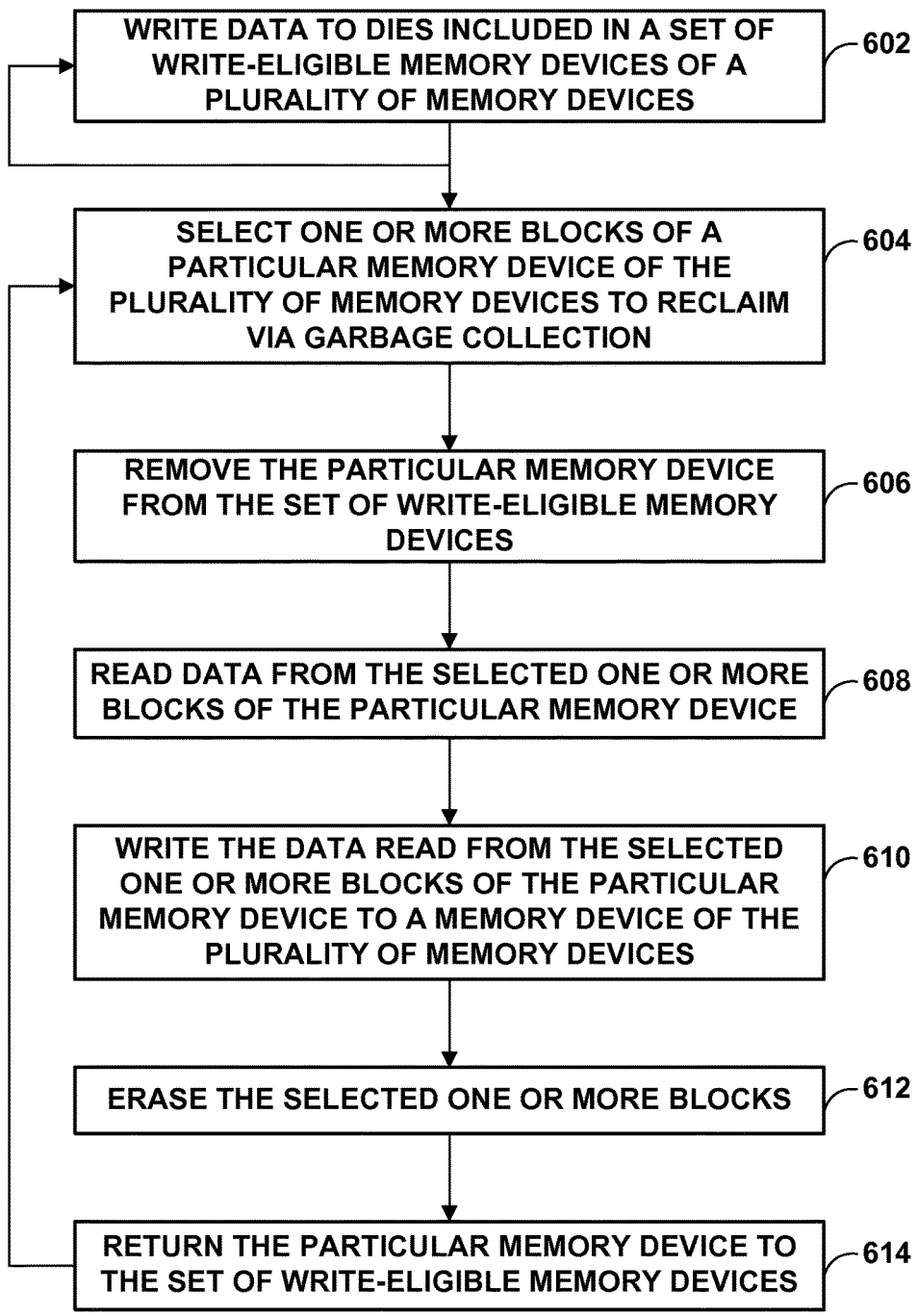
FIG. 6 is a flow diagram illustrating an example technique for performing garbage collection to reclaim one or more blocks of a memory device, in accordance with one or more techniques of this disclosure.

FIG. 6 is a flow diagram illustrating an example technique for performing garbage collection to reclaim one or more blocks of a memory device, in accordance with one or more techniques of this disclosure. The technique of FIG. 6 will be described with concurrent reference to storage device 6 and controller 8 of FIGS. 1 and 3 for ease of description, although computing devices having configurations different than that of storage device 6 or controller 8 may perform the techniques of FIG. 6.

In accordance with one or more techniques of this disclosure, controller 8 may write data to memory devices included in a set of write-eligible memory devices of a plurality of memory devices (602). For instance, scheduling module 30 of controller 8 may schedule write operations to be performed by memory devices of memory devices 16 that are included in the set of write-eligible memory devices. Similarly, scheduling module 30 may refrain from scheduling write operations to be performed by memory devices of memory devices 16 that are not included in the set of write-eligible memory devices.

Controller 8 may select one or more blocks within a particular memory device of the plurality of memory devices to reclaim via garbage collection (604). For instance, maintenance module 26 may determine to reclaim one or more blocks of memory device 16Aa in response to determining that a number of pages of the one or more blocks that contain invalid (stale) data is greater than a threshold number of pages.

Controller 8 may perform garbage collection to reclaim the one or more selected blocks of the particular memory device. For instance, maintenance module 26 may cause scheduling module 30 to remove the particular memory device from the set of write-eligible memory devices of memory devices 16 (606). Maintenance module 26 may read data from the selected one or more blocks of the particular memory device (608). For instance, maintenance module 26 may read data from the selected one or more blocks of the particular memory device while the particular memory device is excluded from the set of write-eligible memory devices.

After reading the data from the selected one or more blocks of the particular memory device, maintenance module 26 may write the data read from the selected one or more blocks of the particular memory device to a memory device of the plurality of memory devices (610), erase the selected one or more blocks of the particular memory device (612), and return the particular memory device to the set of write-eligible memory devices of memory devices (614). In some examples, maintenance module 26 may write the data read from the selected one or more blocks of the particular memory device to a memory device of the plurality of memory devices by requesting that scheduling module 30 schedule write operations, which may be in a same queue as host write operations.

Controller 8 may select one or more other blocks a memory device of the plurality of memory devices to reclaim via garbage collection (604). In some examples, to reduce the load on any one memory device, controller 8 may select one or more blocks of a different memory device of memory devices 16.

As illustrated by FIG. 6, in some examples, controller 8 may continue to write data to memory devices included in the set of write-eligible memory devices of the plurality of memory devices (602) while performing other operations. For instance, while the particular memory device of the plurality of memory devices is excluded from the set of write-eligible memory devices, scheduling module 30 may continue to schedule write operations to performed by other memory devices that are still included in the set of write-eligible memory devices. For example, after reclaiming a first block from a first memory device of the plurality of memory devices and while a second memory device is excluded from the set of write-eligible memory devices e.g., because maintenance module 26 is performing garbage collection to reclaim a block of the second memory device, scheduling module 30 may schedule host write operations and garbage collection write operations (i.e., to write data read from the first block of the first memory device) to performed by other memory devices that are still included in the set of write-eligible memory devices. In this way, by separating garbage collection read operations from garbage collection and host write operations, controller 8 may reduce the amount of time memory devices are unavailable due to garbage collection, which may reduce the amount of time used to fulfill host requests.

The following numbered examples may illustrate one or more aspects of this disclosure:

EXAMPLE 1

A method comprising: writing, by a controller of a plurality of memory devices, data to memory devices that are included in a set of write-eligible memory devices of the plurality of memory devices; and performing, by the controller, garbage collection to reclaim one or more blocks included in a particular memory device of the plurality of memory devices by at least: removing the particular memory device from the set of write-eligible memory devices; reading data from the one or more blocks included in the particular memory device; and returning the particular memory device to the set of write-eligible memory devices.

EXAMPLE 2

The method of example 1, wherein: the plurality of memory devices are physically arranged into a plurality of channels and logically arranged into a plurality of die-sets, writing data to memory devices included in the set of write-eligible memory devices comprises writing data to memory devices included in a set of write-eligible die-sets of the plurality of die-sets, and performing garbage collection on the one or more blocks included in the particular memory device comprises performing garbage collection on one or more blocks included in a particular die-set of the plurality of die-sets by at least: excluding the particular die-set from the set of write-eligible die-sets; reading data from the one or more blocks included in the particular die-set; and returning the particular die-set to the set of write-eligible die-sets.

EXAMPLE 3

The method of any combination of examples 1-2, wherein reading data from the one or more blocks included in the particular memory device comprises reading data from the one or more blocks included in the particular memory device while the particular memory device is not included in the set of write-eligible memory devices.

EXAMPLE 4

The method of any combination of examples 1-3, wherein writing data to the memory devices included in the set of write-eligible memory devices comprises writing data received from a host device to the memory devices included in the set of write-eligible memory devices while the particular memory device is removed from the set of write-eligible memory devices.

EXAMPLE 5

The method of any combination of examples 1-4, wherein the particular memory device is returned to the set of write-eligible memory devices in response to determining that the controller has completed reading the data from the one or more blocks included in the particular memory device.

EXAMPLE 6

The method of any combination of examples 1-5, wherein performing garbage collection on the one or more blocks further comprises writing at least some of the data read from the one or more blocks back to a block of the particular memory device after the particular memory device has been returned to the set of write-eligible memory devices.

EXAMPLE 7

The method of any combination of examples 1-6, wherein performing garbage collection on the one or more blocks further comprises writing at least some of the data read from the one or more blocks to blocks of another memory device of the plurality of memory devices.

EXAMPLE 8

A storage device comprising: a plurality of memory devices; and a controller configured to perform garbage collection to reclaim one or more blocks included in a particular memory device of the plurality of memory devices by at least: removing the particular memory device from the set of write-eligible memory devices; reading data from the one or more blocks included in the particular memory device; and returning the particular memory device to the set of write-eligible memory devices.

EXAMPLE 9

The storage device of example 8, wherein: the plurality of memory devices are physically arranged into a plurality of channels and logically arranged into a plurality of die-sets, the controller is configured to write data to memory devices included in the set of write-eligible memory devices by at least writing data to memory devices included in a set of write-eligible die-sets of the plurality of die-sets, the controller is configured to perform garbage collection on the one or more blocks included in the particular memory device by at least performing garbage collection on one or more blocks included in a particular die-set of the plurality of die-sets, and the controller is configured to perform garbage collection on the one or more blocks included in the particular die-set of the plurality of die-sets by at least: excluding the particular die-set from the set of write-eligible die-sets; reading data from the one or more blocks included in the particular die-set; and returning the particular die-set to the set of write-eligible die-sets.

EXAMPLE 10

The storage device of any combination of examples 8-9, wherein, to read data from the one or more blocks included in the particular memory device, the controller is configured to read data from the one or more blocks included in the particular memory device while the particular memory device is not included in the set of write-eligible memory devices.

EXAMPLE 11

The storage device of any combination of examples 8-10, wherein, to write data to the memory devices included in the set of write-eligible memory devices, the controller is configured to write data received from a host device to the memory devices included in the set of write-eligible memory devices while the particular memory device is removed from the set of write-eligible memory devices.

EXAMPLE 12

The storage device of any combination of examples 8-11, wherein the controller is configured to return the particular memory device to the set of write-eligible memory devices after reading the data from the one or more blocks included in the particular memory device.

EXAMPLE 13

The storage device of any combination of examples 8-12, wherein, to perform garbage collection on the one or more blocks, the controller is further configured to write at least some of the data read from the one or more blocks back to a block of the particular memory device after the particular memory device has been returned to the set of write-eligible memory devices.

EXAMPLE 14

The storage device of any combination of examples 8-13, wherein, to perform garbage collection on the one or more blocks, the controller is further configured to write at least some of the data read from the one or more blocks to blocks of another memory device of the plurality of memory devices.

EXAMPLE 15

A computer-readable storage medium storing instructions that, when executed, cause one or more processors of a storage device to: write data to memory devices of a plurality of memory devices that are included in a set of write-eligible memory devices; and perform garbage collection to reclaim one or more blocks included in a particular memory device of the plurality of memory devices by at least: removing the particular memory device from the set of write-eligible memory devices; reading data from the one or more blocks included in the particular memory device; and returning the particular memory device to the set of write-eligible memory devices.

EXAMPLE 16

The computer-readable storage medium of example 15, further comprising instructions that, when executed, cause the one or more processors to perform the method of any combination of examples 1-7.

EXAMPLE 17

A system comprising: means for writing data to memory devices of a plurality of memory devices included in a set of write-eligible memory devices; and means for performing garbage collection to reclaim one or more blocks included in a particular memory device of the plurality of memory devices, wherein the means for performing garbage collection include: means for removing the particular memory device from the set of write-eligible memory devices; means for reading data from the one or more blocks included in the particular memory device; and means for returning the particular memory device to the set of write-eligible memory devices.

EXAMPLE 18

The system of example 17, further comprising means for performing the method of any combination of examples 1-7.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
writing, by a controller of a plurality of memory devices, data to memory devices that are logically included in a set of write-eligible memory devices of the plurality of memory devices; and
performing, by the controller, garbage collection to reclaim one or more blocks included in a particular memory device of the plurality of memory devices by at least:
logically removing the particular memory device from the set of write-eligible memory devices;
reading data from the one or more blocks included in the particular memory device; and
logically returning the particular memory device to the set of write-eligible memory devices.

2. The method of claim 1, wherein:
the plurality of memory devices are physically arranged into a plurality of channels and logically arranged into a plurality of die-sets,
writing data to memory devices logically included in the set of write-eligible memory devices comprises writing data to memory devices logically included in a set of write-eligible die-sets of the plurality of die-sets, and
performing garbage collection on the one or more blocks included in the particular memory device comprises performing garbage collection on one or more blocks included in a particular die-set of the plurality of die-sets by at least:
logically excluding the particular die-set from the set of write-eligible die-sets;
reading data from the one or more blocks included in the particular die-set; and
logically returning the particular die-set to the set of write-eligible die-sets.

3. The method of claim 1, wherein reading data from the one or more blocks included in the particular memory device comprises reading data from the one or more blocks included in the particular memory device while the particular memory device is not logically included in the set of write-eligible memory devices.

4. The method of claim 1, wherein writing data to the memory devices logically included in the set of write-eligible memory devices comprises writing data received from a host device to the memory devices logically included in the set of write-eligible memory devices while the particular memory device is logically removed from the set of write-eligible memory devices.

5. The method of claim 1, wherein the particular memory device is logically returned to the set of write-eligible memory devices in response to determining that the controller has completed reading the data from the one or more blocks included in the particular memory device.

6. The method of claim 1, wherein performing garbage collection on the one or more blocks further comprises writing at least some of the data read from the one or more blocks back to a block of the particular memory device after the particular memory device has been logically returned to the set of write-eligible memory devices.

7. The method of claim 1, wherein performing garbage collection on the one or more blocks further comprises writing at least some of the data read from the one or more blocks to blocks of another memory device of the plurality of memory devices.

8. A storage device comprising:
a plurality of memory devices; and
a controller configured to perform garbage collection to reclaim one or more blocks included in a particular memory device of the plurality of memory devices by at least:
logically removing the particular memory device from a set of write-eligible memory devices;
reading data from the one or more blocks included in the particular memory device; and
logically returning the particular memory device to the set of write-eligible memory devices.

9. The storage device of claim 8, wherein:
the plurality of memory devices are physically arranged into a plurality of channels and logically arranged into a plurality of die-sets,
the controller is configured to write data to memory devices logically included in the set of write-eligible memory devices by at least writing data to memory devices included in a set of write-eligible die-sets of the plurality of die-sets,
the controller is configured to perform garbage collection on the one or more blocks included in the particular memory device by at least performing garbage collection on one or more blocks included in a particular die-set of the plurality of die-sets, and
the controller is configured to perform garbage collection on the one or more blocks included in the particular die-set of the plurality of die-sets by at least:
excluding the particular die-set from the set of write-eligible die-sets;
reading data from the one or more blocks included in the particular die-set; and
returning the particular die-set to the set of write-eligible die-sets.

10. The storage device of claim 8, wherein, to read data from the one or more blocks included in the particular memory device, the controller is configured to read data from the one or more blocks included in the particular memory device while the particular memory device is not logically included in the set of write-eligible memory devices.

11. The storage device of claim 8, wherein, to write data to the memory devices logically included in the set of write-eligible memory devices, the controller is configured to write data received from a host device to the memory devices logically included in the set of write-eligible memory devices while the particular memory device is logically removed from the set of write-eligible memory devices.

12. The storage device of claim 8, wherein the controller is configured to logically return the particular memory device to the set of write-eligible memory devices after reading the data from the one or more blocks included in the particular memory device.

13. The storage device of claim 8, wherein, to perform garbage collection on the one or more blocks, the controller is further configured to write at least some of the data read from the one or more blocks back to a block of the particular memory device after the particular memory device has been logically returned to the set of write-eligible memory devices.

14. The storage device of claim 8, wherein, to perform garbage collection on the one or more blocks, the controller is further configured to write at least some of the data read from the one or more blocks to blocks of another memory device of the plurality of memory devices.

15. A non-transitory computer-readable storage medium storing instructions that, when executed, cause one or more processors of a storage device to:
    write data to memory devices of a plurality of memory devices that are included in a set of write-eligible memory devices; and
    perform garbage collection to reclaim one or more blocks included in a particular memory device of the plurality of memory devices by at least:
        logically removing the particular memory device from the set of write-eligible memory devices;
        reading data from the one or more blocks included in the particular memory device; and
        logically returning the particular memory device to the set of write-eligible memory devices.

16. The non-transitory computer-readable storage medium of claim 15, wherein:
    the plurality of memory devices are physically arranged into a plurality of channels and logically arranged into a plurality of die-sets,
    the instructions that cause the one or more processors to write data to memory devices logically included in the set of write-eligible memory devices comprise instructions that cause the one or more processors to write data to memory devices logically included in a set of write-eligible die-sets of the plurality of die-sets, and
    the instructions that cause the one or more processors to perform garbage collection on the one or more blocks included in the particular memory device comprise instructions that cause the one or more processors to perform garbage collection on one or more blocks included in a particular die-set of the plurality of die-sets by at least:
        logically excluding the particular die-set from the set of write-eligible die-sets;
        reading data from the one or more blocks included in the particular die-set; and
        logically returning the particular die-set to the set of write-eligible die-sets.

17. The non-transitory computer-readable storage medium of claim 15, wherein reading data from the one or more blocks included in the particular memory device comprises reading data from the one or more blocks included in the particular memory device while the particular memory device is not logically included in the set of write-eligible memory devices.

18. A system comprising:
    means for writing data to memory devices of a plurality of memory devices logically included in a set of write-eligible memory devices; and
    means for performing garbage collection to reclaim one or more blocks included in a particular memory device of the plurality of memory devices, wherein the means for performing garbage collection include:
        means for logically removing the particular memory device from the set of write-eligible memory devices;
        means for reading data from the one or more blocks included in the particular memory device; and
        means for logically returning the particular memory device to the set of write-eligible memory devices.

19. The system of claim 18, wherein:
    the plurality of memory devices are physically arranged into a plurality of channels and logically arranged into a plurality of die-sets,
    the means for writing data to memory devices logically included in the set of write-eligible memory devices comprise means for writing data to memory devices logically included in a set of write-eligible die-sets of the plurality of die-sets,
    the means for performing garbage collection on the one or more blocks included in the particular memory device comprise means for performing garbage collection on one or more blocks included in a particular die-set of the plurality of die-sets, and
    the means for performing garbage collection on the one or more blocks included in the particular die-set of the plurality of die-sets include:
        means for logically excluding the particular die-set from the set of write-eligible die-sets;
        means for reading data from the one or more blocks included in the particular die-set; and
        means for logically returning the particular die-set to the set of write-eligible die-sets.

20. The system of claim 18, wherein the means for writing data to the memory devices included in the set of write-eligible memory devices comprise means for writing data received from a host device to the memory devices logically included in the set of write-eligible memory devices while the particular memory device is logically removed from the set of write-eligible memory devices.

* * * * *